United States Patent
Hewton

(10) Patent No.: US 7,841,539 B2
(45) Date of Patent: Nov. 30, 2010

(54) SMART CARD WITH RANDOM TEMPORARY ACCOUNT NUMBER GENERATION

(76) Inventor: Alfred Hewton, 6480 Sharon Kay Ct., Alexandria, VA (US) 22310

( * ) Notice: Subject to any disclaimer, the term of this patent is extended or adjusted under 35 U.S.C. 154(b) by 563 days.

(21) Appl. No.: 11/979,427

(22) Filed: Nov. 2, 2007

(65) Prior Publication Data

US 2008/0201265 A1 Aug. 21, 2008

Related U.S. Application Data

(60) Provisional application No. 60/901,300, filed on Feb. 15, 2007.

(51) Int. Cl.
*G06K 19/06* (2006.01)
(52) U.S. Cl. .............. 235/492; 235/380; 705/39; 705/44; 705/67
(58) Field of Classification Search ............ 235/380, 235/492; 705/39, 44, 67
See application file for complete search history.

(56) References Cited

U.S. PATENT DOCUMENTS

| | | | |
|---|---|---|---|
| 5,541,994 A | 7/1996 | Tomko et al. | |
| 5,583,933 A | 12/1996 | Mark | |
| 5,680,460 A | 10/1997 | Tomko et al. | |
| 5,712,912 A | 1/1998 | Tomko et al. | |
| 5,832,091 A | 11/1998 | Tomko et al. | |
| 6,003,764 A | 12/1999 | De Rooij et al. | |
| 6,325,285 B1 | 12/2001 | Baratelli | |
| 6,454,173 B2 | 9/2002 | Graves | |
| 6,852,031 B1 | 2/2005 | Rowe | |
| 7,028,893 B2 | 4/2006 | Goodman et al. | |
| 7,043,643 B1 | 5/2006 | Doe et al. | |
| 7,155,416 B2 | 12/2006 | Shatford | |
| 7,163,153 B2 | 1/2007 | Blossom | |
| 2003/0200180 A1 | 10/2003 | Phelan, III et al. | |
| 2004/0050930 A1 | 3/2004 | Rowe | |
| 2005/0005108 A1 | 1/2005 | Harper | |
| 2005/0197945 A1 | 9/2005 | Harper | |
| 2006/0059365 A1 | 3/2006 | Harper | |
| 2006/0213973 A1 | 9/2006 | Chan et al. | |
| 2007/0078783 A1* | 4/2007 | Shatford | 705/67 |
| 2007/0106611 A1* | 5/2007 | Larsen | 705/44 |
| 2008/0021782 A1* | 1/2008 | Wieth et al. | 705/14 |
| 2008/0116285 A1* | 5/2008 | Shoemaker | 235/493 |
| 2010/0030637 A1* | 2/2010 | Koplar | 705/14.39 |
| 2010/0065628 A1* | 3/2010 | Carmichael et al. | 235/382 |

FOREIGN PATENT DOCUMENTS

GB 2132857 A 7/1984

* cited by examiner

*Primary Examiner*—Allyson N Trail
(74) *Attorney, Agent, or Firm*—Richard C. Litman

(57) ABSTRACT

The smart card with random temporary account number generation provides an authenticating system coupled with an access or transaction card, such as a credit card. The card includes first and second memory storage media, with the first memory medium containing a plurality of temporary account or authentication numbers. The card also has a biometric sensor, such as a fingerprint scanner, and the second memory stores the biometric parameters of the authorized user. A processor compares the biometric parameters with the measured biometric readings to enable the card. The processor has a random number generator, allowing for the randomized selection of one of the account numbers stored in the first memory, thus providing a temporary account number for the transaction. A remote site includes an identical random number generator and set of account numbers, allowing the temporary account number to be verified and then discarded, following the transaction.

6 Claims, 4 Drawing Sheets

SMART CARD WITH RANDOM TEMPORARY ACCOUNT NUMBER GENERATION

CROSS-REFERENCE TO RELATED APPLICATION

This application claims the benefit of U.S. Provisional Patent Application Ser. No. 60/901,300, filed Feb. 15, 2007.

BACKGROUND OF THE INVENTION

1. Field of the Invention

The present invention relates to smart cards and other authorization, authentication and access cards, and particularly to a smart card with random temporary account number generation for generating random temporary account numbers associated with the card, each temporary account number only being used for a single transaction.

2. Description of the Related Art

Credit card theft and fraud is responsible for millions of dollars of loss to both consumers and industry each year. When a credit card is either lost or stolen, someone other than the authorized user of the credit card can use the card for point-of-sale transactions until the credit card is canceled. Although credit cards include a signature strip, these signatures are rarely checked and can be easily forged. It would be desirable to provide an authentication system linked to the actual card at the point of sale.

In recent years, shopping over the Internet has become common in a large percentage of homes and businesses. Online shopping does not require the usage of a physical credit card, as most systems merely require the input of the credit card account number and expiration date. Thus, a thief merely needs knowledge of the authorized user's account number to perform fraudulent transactions. It would be desirable to provide a credit card with a temporary account number, with that account number being erased and replaced by a new account number following each transaction.

Thus, a smart card with random temporary account number generation solving the aforementioned problems is desired.

SUMMARY OF THE INVENTION

The smart card with random temporary account number generation is an access card, similar to a credit card or the like, which provides secure authorization and authentication for a user-based transaction. The smart card includes a card having an upper and a lower surface, with the card preferably being configured and dimensioned similar to a conventional credit card.

A first memory storage medium is joined to the card, with the first memory storage medium storing a plurality of temporary account numbers. The first memory storage medium may be random access memory (RAM), erasable programmable read only memory (EPROM), or any other suitable memory storage medium. The temporary account numbers may be 16-digit account numbers, as are associated with conventional credit cards, or may be any other type of account number or identification number. Alphanumeric or other types of codes or characters may be used for authentication or access procedures. The account numbers or other codes may further be encrypted.

A biometric sensor is mounted to the upper surface of the card for making biometric measurements of the user. The biometric sensor is preferably a fingerprint scanner, although it should be understood that any type of biometric measurements may be made. A second memory storage medium, similar to the first memory storage medium, is joined to the card, with the second memory storage medium storing biometric parameters specific to an authorized user of the smart card. For example, if the biometric sensor is a fingerprint scanner, then an image of the authorized user's fingerprint is stored in the second memory storage medium for comparison.

A processor in the form of a central processing unit (CPU), microprocessor, or the like are also joined to the card, with the processor being in communication with the first memory storage medium, the second memory storage medium and the biometric sensor. The processor compares the biometric measurement signals generated by the biometric sensor with the biometric parameters specific to the authorized user of the smart card stored in the second memory storage medium. If the biometric measurements signals measured by the biometric sensor match the biometric parameters stored in memory, the card is enabled for a transaction. If the biometric measurement signals do not match, the card is disabled and cannot be used until the authorized user actuates the card.

The processor further includes a random number generator for randomly selecting one of the plurality of temporary account numbers stored in the first memory storage medium. For example, if one thousand temporary account numbers are initially stored in the first memory storage medium, then each account number is assigned a number between one and one thousand. The random number generator then generates a number between one and one thousand, allowing the corresponding temporary account number to be selected.

The smart card further includes means for communicating the randomly selected temporary account number to a remote authorization system. The remote authorization system may be a computer associated with the credit card company, for example. The remote authorization system includes a remote random number generator, which is identical to the random number generator of the processor, and further, a set of temporary account numbers, which is identical to the plurality of temporary account numbers stored in the first memory storage medium.

Two identical random number generators are of a type that, when starting from the same seed value, will produce the same set of random numbers. For example, if the random number generator of the smart card produces the random number "3" in the first iteration, the random number "217" in the second iteration and the random number "882": in the third iteration, then the remote random number generator will also produce "3", "217" and "882", in that order.

The remote authorization system selects a remote temporary account number and compares the remote temporary account number to the randomly selected temporary account number generated by the smart card processor. The transaction is authorized if the two account numbers match. The means for communicating the account numbers may be a direct electrical connection between electrical contacts the smart card and a card reader at the point of transaction, with the card reader being in communication with the remote authorization system through phone lines, the Internet or the like. Alternatively, the means may include a programmable magnetic stripe, allowing the account number to be read by a conventional credit card reader.

In a preferred embodiment, a liquid crystal display (LCD) is mounted to the upper surface of the card, with the LCD being in communication with the processor. The LCD displays the selected temporary account number, which can then be optically scanned and transmitted to the remote authorization system through telephone lines, the Internet or the like, or may be manually entered into a separate computer by the store clerk, for example, for transmission to the remote site. Following a successful, authenticated transaction, the temporary account number is preferably erased from both the smart card and the remote authorization site.

The smart card further includes a power source, such as a battery, mounted to the card for providing electrical energy. In a preferred embodiment, a solar cell is provided on either the upper or lower surface of the card for providing power or recharging a battery.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
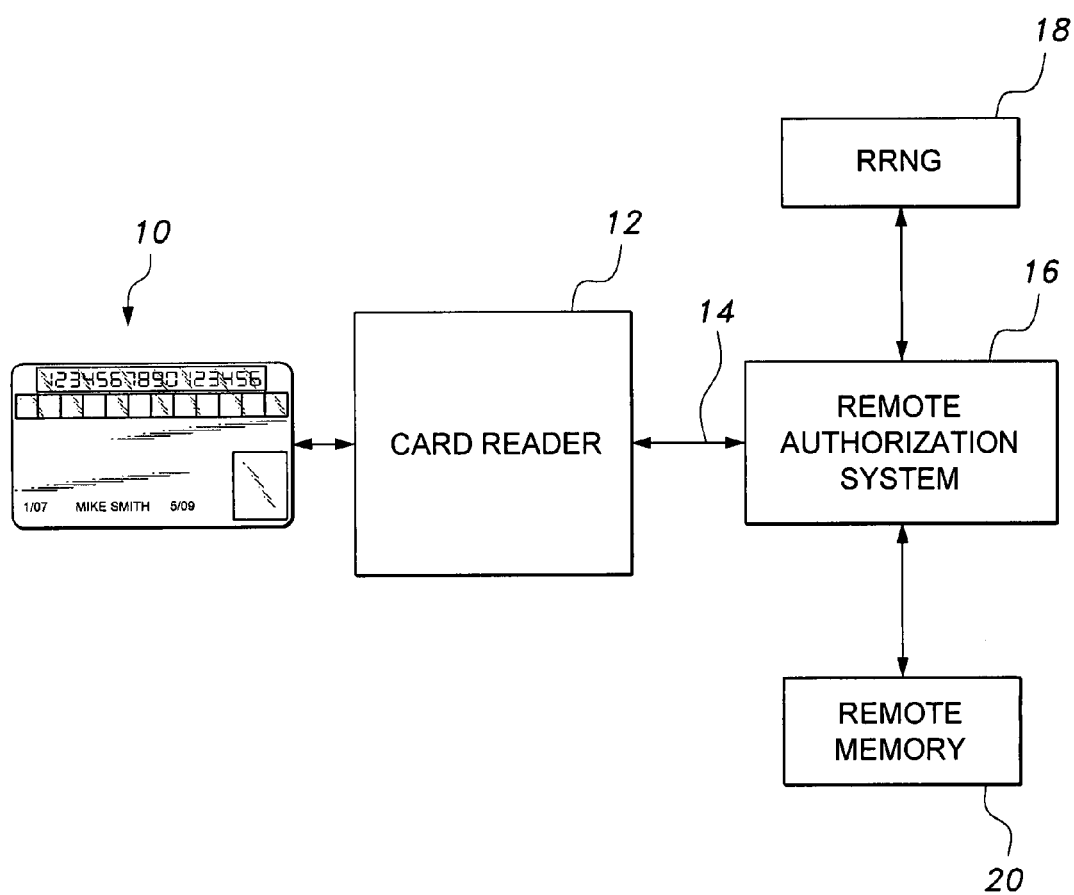
FIG. 1 is a block diagram of a system for using a smart card with random temporary account number generation according to the present invention.

The smart card with random temporary account number generation is an access card, similar to a credit card or the like, which provides secure authorization and authentication for a user-based transaction. In the exemplary system of FIG. 1, the smart card 10 (shown in greater detail in FIG. 2) is inserted into, or swiped through, a card reader 12. As will be described in further detail below, the smart card 10 may include a programmable magnetic stripe or any other interface for transferring or transmitting the account number associated with card 10 to the card reader 12. Card reader 12 may be a standard credit card reader, or may be any other form of interface for accessing the account number, as will be described in greater detail below.

It should be understood that the smart card 10 is not limited to financial transactions, such as those commonly associated with credit cards. The smart card 10 may be used as an access card, an authentication card, or may be used for any suitable purpose or with any suitable system. Card 10 may include particular data or identifying indicia 36 associated with the particular type of transaction or usage of the card.

Figure 2:
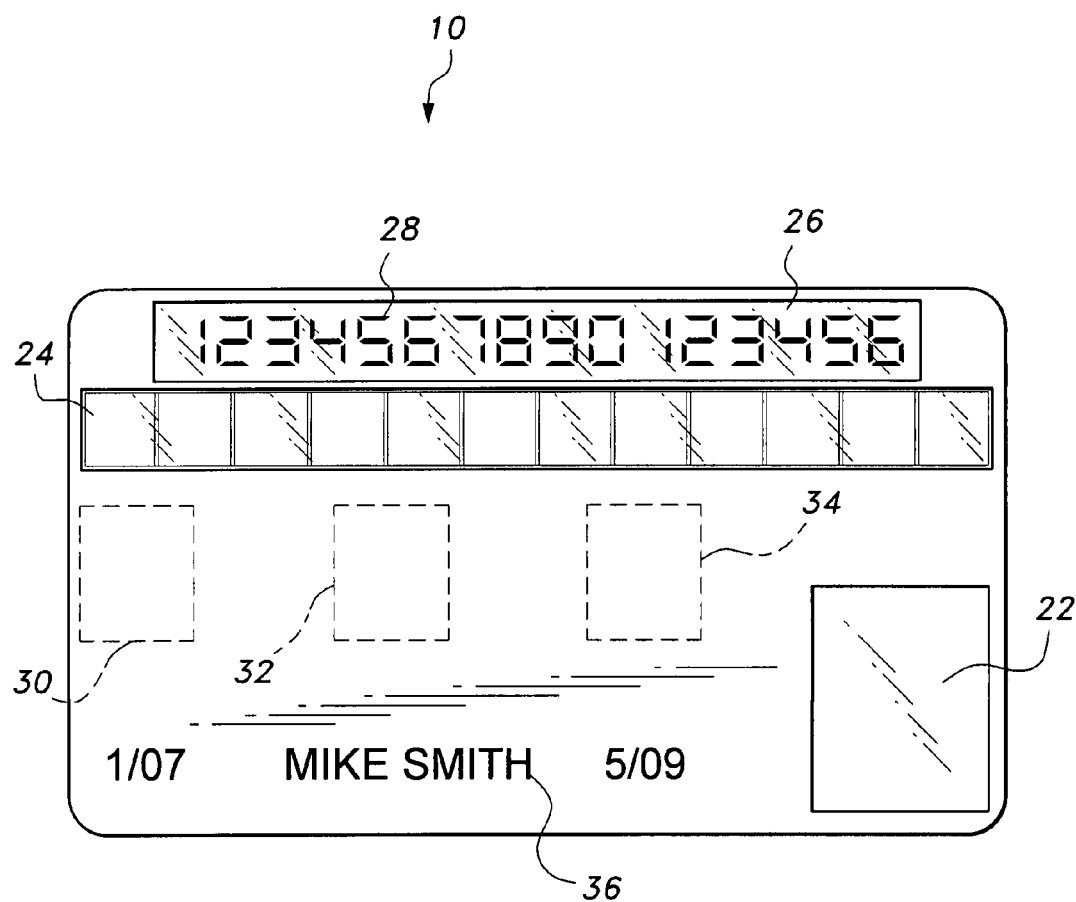
FIG. 2 is a plan view of the smart card with random temporary account number generation according to the present invention.

As best shown in FIG. 2, the smart card 10 includes a card body having an upper and a lower surface, with the card body preferably being contoured and dimensioned similar to a conventional credit card. As described above, the smart card 10 may be utilized for other purposes, and may have any suitable dimensions and configuration for its intended use.

A first memory storage medium 30 is joined to the card body, with the first memory storage medium 30 storing a plurality of temporary account numbers. The first memory storage medium 30 may be random access memory (RAM), erasable programmable read only memory (EPROM), or any other suitable memory storage medium. The temporary account numbers may be 16-digit account numbers, as are commonly associated with conventional credit cards, or may be any other type of account number or identification number. Alphanumeric or other types of codes or characters may be used for authentication or access procedures. The account numbers or other codes may further be encrypted.

A biometric sensor 22 is mounted to the upper surface of the card body for making biometric measurements of the user. The biometric sensor 22 is preferably a fingerprint scanner, although it should be understood that any type of biometric measurements may be made. Fingerprint scanners coupled with smart cards are well known in the art and one such system is disclosed in U.S. Pat. No. 7,028,893, issued to Goodman et al., which is hereby incorporated by reference. Alternatively, the fingerprint scanner 22 may be located external to the smart card 10, such as being integrated with the card reader 12.

A second memory storage medium 32, similar to the first memory storage medium 30, is joined to the card body, with the second memory storage medium 32 storing biometric parameters specific to an authorized user of the smart card 10. For example, if the biometric sensor 22 is a fingerprint scanner, then a digital image of the authorized user's fingerprint is stored in the second memory storage medium 32 for comparison.

Figure 3:
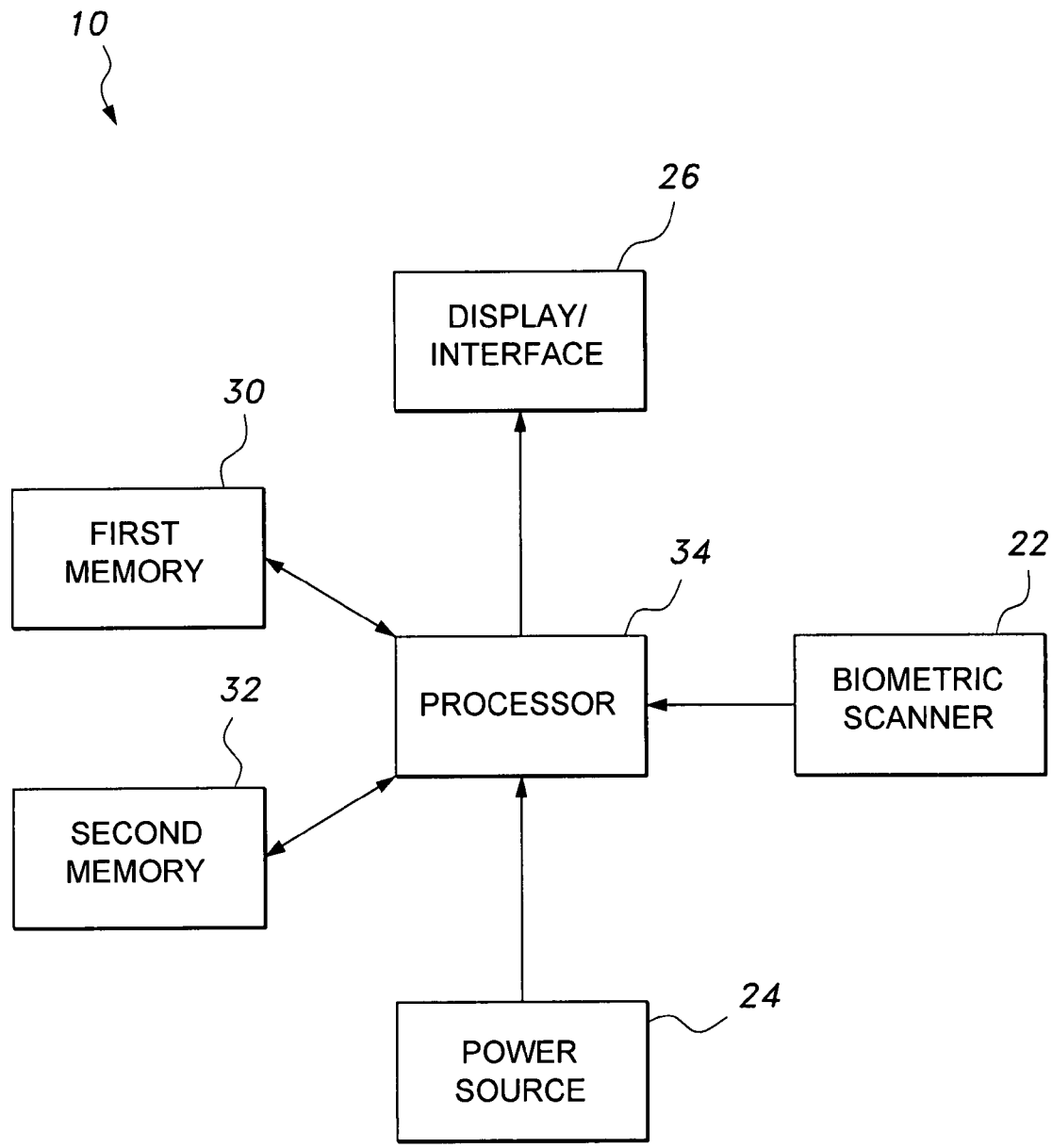
FIG. 3 is a block diagram of a smart card with random temporary account number generation according to the present invention.

Processor 34, in the form of a central processing unit (CPU), microprocessor, or the like, is also joined to the card body, with the processor 34 being in communication with the first memory storage medium 30, the second memory storage medium 32 and the biometric sensor 22 (shown in schematic block form in FIG. 3). The processor 34 compares the biometric measurement signals generated by the biometric sensor 22 with the biometric parameters specific to the authorized user of the smart card 10, which are stored in the second memory storage medium 32. If the biometric measurement signals measured by the biometric scanner 22 match the biometric parameters stored in memory 32, the card 10 is enabled for a transaction. If the biometric measurement signals do not match, the card 10 is disabled and cannot be used until the authorized user actuates the card 10.

The processor 34 further includes a random number generator for randomly selecting one of the plurality of temporary account numbers stored in the first memory storage medium 30. The random number generator may utilize any suitable random number generating algorithm, for example: the Blum Blum Shub algorithm, the Indirection Shift Accumulate Add and Count (ISAAC) algorithm, the Mersenne Twister algorithm, a linear congruential generation algorithm, or any other suitable algorithm.

The random number generator may be an algorithm, which is run as a subroutine on processor 34, or may be a separate processing chip or circuit in communication with processor 34. As an example, if one thousand temporary account numbers are initially stored in the first memory storage medium 30, then each account number is assigned a number between one and one thousand. The random number generator then generates a random number between one and one thousand, allowing the corresponding temporary account number to be selected.

Figure 4:
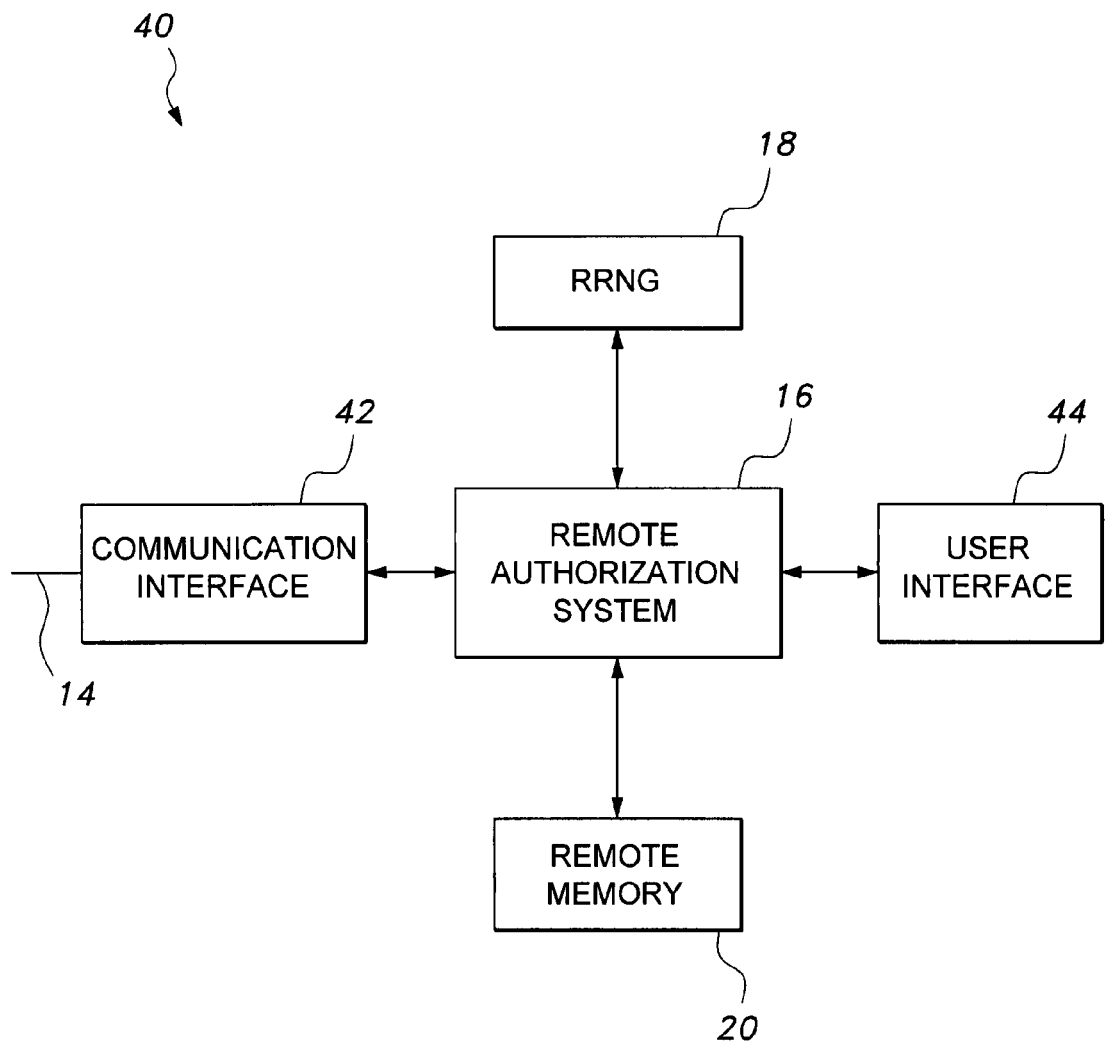
FIG. 4 is a block diagram of a remote authentication site in a system for using a smart card with random temporary account number generation according to the present invention.

The smart card 10 further includes means for communicating the randomly selected temporary account number to a remote authorization system 16. The remote authorization system 16 may be a computer associated with a credit card company, for example. The remote authorization system 16 includes a remote random number generator (RRNG) 18, which is identical to the random number generator of the processor 34 (i.e., the RRNG runs the same random number generating algorithm, starting at the same initial seed value)

and, further, a set of temporary account numbers which is identical to the plurality of temporary account numbers stored in the first memory storage medium 30. As shown in FIG. 4, the remote authorization system 16 is located at a remote site 40, and may be a computer or the like, with either an integrated or separate RRNG 18, and either an integrated or separate remote memory device 20, which stores the set of temporary account numbers.

The two identical random number generators are of the type that, when starting from the same seed value, will produce the same set of random numbers in the same sequential order. For example, if the random number generator of the smart card 10 produces the random number "3" in the first iteration, the random number "217" in the second iteration and the random number "882" in the third iteration, then the remote random number generator 18, which follows an identical random number generation algorithm and starts from the same seed value, will also produce "3", "217" and "882", in that order. Hence, this procedure offers an alternative to a digital signature, which also uses a random number generator, but with the advantage of not communicating the actual account number during the course of the transaction.

At the time of transaction, following actuation of the card 10 via the biometric scanner 22, the processor 34 generates a random number, which is then associated with one of the account numbers stored in first memory 30. This selects the temporary account number associated with card 10 for that particular transaction. The remote authorization system 16 then selects a remote temporary account number, which should be identical to the temporary account number stored on the card 10 if this is an authentic and authorized transaction, and compares the remote temporary account number to the randomly selected temporary account number generated by the processor 34. The transaction is authorized if the two temporary account numbers match.

The means for communicating the account numbers may be a direct electrical connection between electrical contacts of the smart card 10 and the card reader 12 at the point of transaction, with the card reader 12 being in communication with the remote authorization system 16 through phone lines, the Internet or the like. The generalized communication line between the card reader 12 and a communication interface 42 at the remote site 40 (which may be a modem, a telephone, or any other suitable interface) is shown as 14 in the drawings.

Alternatively, the means for communicating may include a programmable magnetic stripe, allowing the account number to be read by a conventional credit card reader. Programmable magnetic stripes associated with smart cards are well known in the art. One such system is disclosed in U.S. Pat. No. 7,163,153, issued to Blossom, which is hereby incorporated by reference. Once the temporary account number is selected, the programmable magnetic stripe (preferably mounted to the lower surface of the card body) is encoded with the account number, which can then be read by a conventional credit card reader.

In a preferred embodiment, shown in FIG. 2, a liquid crystal display (LCD) 26 is disposed on the upper surface of the card body, with the LCD being in communication with the processor 34. It should be understood that any suitable visual display may be utilized. The display 26 displays the selected temporary account number (shown here for exemplary purposes only as a 16-digit string of numbers designated 28), which can then be optically scanned and transmitted to the remote authorization system through telephone lines, the Internet or the like, or may be manually entered into a separate computer by the store clerk, for example, for transmission to the remote site. Card reader 12 may include an optical scanner for optically scanning the string of numbers 28, and then transmitting either a digital image or a set of numbers captured via optical character recognition (OCR) through line 14 to interface 42 and system 16. It should be understood that any interface or method may be used to transfer or transmit the temporary account number from card 10 to remote authorization system 16.

Following a successful, authenticated transaction, the temporary account number is preferably erased from both the smart card 10 and remote memory 20 of the remote authorization site 40. A user-defined time limit may be programmed into card 10; for example, five minutes after a successful transaction, the selected temporary account number is erased from first memory 30. Once all of the account numbers have been erased from the memory 30, either a new set of account numbers may be stored in first memory 30, or the user may be issued a new card with a new set of account numbers stored thereon. As an alternative, the account number is not erased immediately, but is stored, allowing the temporary account number to be used again only for reversing a previous transaction associated with this number, such as, for example, when the user decides to return merchandise to a retailer where the smart card 10 was used.

The smart card 10 further includes a power source 24, such as a battery, mounted to the card body for providing electrical energy. In the preferred embodiment, a solar cell is provided on either the upper or lower surface of the card for providing power or for recharging the battery.

It is to be understood that the present invention is not limited to the embodiments described above, but encompasses any and all embodiments within the scope of the following claims.

I claim:

1. A method of using a smart card with random temporary account number generation, comprising the steps of:

providing a smart card having a first memory storage medium, a second memory storage medium, a biometric sensor, and a processor having a random number generator;

storing a plurality of temporary account numbers in the first memory storage medium;

storing biometric parameters specific to an authorized user of the smart card in the second memory storage medium;

sending biometric measurement signals associated with a user generated by the biometric sensor to the processor;

comparing the biometric measurement signals with the biometric parameters specific to the authorized user of the smart card stored in the second memory storage medium;

generating an authentication signal activating the smart card for use when the biometric measurement signals match the stored biometric parameters;

deactivating the smart card when the biometric measurement signals do not match the stored biometric parameters;

assigning a selection number to each of the plurality of temporary account numbers stored in the first memory storage medium;

generating a random number via the random number generator;

selecting one of the plurality of temporary account numbers associated with the generated random number;

communicating the selected temporary account number to a remote authorization site;

storing a set of temporary account numbers at the remote authorization site identical to the plurality of temporary account numbers stored in the first memory storage medium, the temporary account numbers at the remote authorization site having corresponding index numbers;

generating a remote random number at the remote authorization site with a remote random number generator identical to the random number generator on the smart card;

comparing the remote random number with the corresponding index numbers to select a remote site temporary account number;

comparing the selected temporary account number to the remote site temporary account number; and generating an authorization signal when the selected temporary account number matches the remote site temporary account number.

2. The method of using a smart card with random temporary account number generation as recited in claim 1, further comprising the steps of:

following the generation of the authorization signal, erasing the selected temporary account number from the first memory storage medium; and erasing the remote site temporary account number from the remote authorization site.

3. The method of using a smart card with random temporary account number generation as recited in claim 2, further comprising the steps of:

providing a card reader having an optical scanner; and reading the displayed selected temporary account number with the optical scanner for communication thereof to the remote authorization site.

4. The method of using a smart card with random temporary account number generation as recited in claim 1, further comprising the step of displaying the selected temporary account number on a display attached to the smart card.

5. The method of using a smart card with random temporary account number generation as recited in claim 1, further comprising the step of coding the selected temporary account number onto a programmable magnetic stripe on the smart card.

6. The method of using a smart card with random temporary account number generation as recited in claim 5, further comprising the steps of:

providing a card reader having a magnetic stripe reader; and reading the coded selected temporary account number with the magnetic stripe reader for communication thereof to the remote authorization site.

\* \* \* \* \*